United States Patent
Shimono et al.

(10) Patent No.: US 7,657,700 B2
(45) Date of Patent: Feb. 2, 2010

(54) RECORDING DEVICE, RECORDING-MEDIUM-MANAGEMENT METHOD, PROGRAM OF RECORDING-MEDIUM-MANAGEMENT METHOD, AND RECORDING MEDIUM RECORDING PROGRAM OF RECORDING-MEDIUM-MANAGEMENT METHOD

(75) Inventors: Hiroshi Shimono, Tokyo (JP); Junichi Yokota, Kanagawa (JP); Ryogo Ito, Tokyo (JP); Fumihiko Kaise, Tokyo (JP); Kunihiko Take, Kanagawa (JP); Hirofumi Todo, Tokyo (JP); Keiji Kanota, Kanagawa (JP); Kenichiro Imai, Kanagawa (JP); Ko Kobayashi, Tokyo (JP); Katsuhiko Watanabe, Saitama (JP)

(73) Assignee: Sony Corporation (JP)

( * ) Notice: Subject to any disclaimer, the term of this patent is extended or adjusted under 35 U.S.C. 154(b) by 465 days.

(21) Appl. No.: 11/543,927

(22) Filed: Oct. 4, 2006

(65) Prior Publication Data
US 2007/0162686 A1    Jul. 12, 2007

(30) Foreign Application Priority Data
Oct. 4, 2005    (JP) .......................... P2005-290875

(51) Int. Cl.
*G06F 12/00* (2006.01)
*G03B 17/00* (2006.01)
(52) U.S. Cl. ........................ 711/103; 711/112; 711/154; 396/321
(58) Field of Classification Search ................. 396/321; 348/294
See application file for complete search history.

(56) References Cited

U.S. PATENT DOCUMENTS

| 6,243,538 | B1* | 6/2001 | Okuno | 396/321 |
| 2004/0064629 | A1* | 4/2004 | Kaku | 711/1 |
| 2005/0193170 | A1* | 9/2005 | Endo | 711/115 |
| 2007/0277016 | A1* | 11/2007 | Risse | 711/170 |

FOREIGN PATENT DOCUMENTS

| JP | 7-221902 A | 8/1995 |
| JP | 11-259994 A | 9/1999 |
| JP | 2001-175512 A | 6/2001 |
| JP | 2005-228380 | 8/2005 |
| WO | 200429968 A2 | 4/2004 |

* cited by examiner

*Primary Examiner*—Jack A Lane
(74) *Attorney, Agent, or Firm*—Lerner, David, Littenberg, Krumholz & Mentlik, LLP

(57) ABSTRACT

A recording device which records data onto a recording medium includes a nonvolatile memory storing and holding data on a free capacity of the recording medium, and a control unit controlling the data recording. The control unit determines the free-capacity data stored in the nonvolatile memory based on the total capacity of the recording medium when power is turned on. When the determination result indicates that a value of the free-capacity data stored in the nonvolatile memory does not exceed a value of the total capacity of the recording medium, the control unit records the data onto the recording medium with reference to the free-capacity data. When the power is turned off, the control unit updates the free-capacity data so as to reduce the value of the free-capacity data by as much as an amount of the data recorded onto the recording medium.

13 Claims, 9 Drawing Sheets

RECORDING DEVICE, RECORDING-MEDIUM-MANAGEMENT METHOD, PROGRAM OF RECORDING-MEDIUM-MANAGEMENT METHOD, AND RECORDING MEDIUM RECORDING PROGRAM OF RECORDING-MEDIUM-MANAGEMENT METHOD

CROSS-REFERENCE TO RELATED APPLICATIONS

The present application claims priority from Japanese Patent Application No. JP 2005-290875 filed on Oct. 4, 2005, the disclosure of which is hereby incorporated by reference herein.

BACKGROUND OF THE INVENTION

1. Field of the Invention

The present invention relates to a recording device, a recording-medium-management method, a program of the recording-medium-management method, and a recording medium recorded with the program of the recording-medium-management method, and can be used for a digital still camera, for example. The present invention allows for storing data on free capacity of the recording medium in a nonvolatile memory independently. Further, the present invention allows for confirming the recorded free-capacity data on the basis of the total capacity of the recording medium and starting recording data when the recording device is started. Subsequently, it becomes possible to access the recording medium correctly on the basis of the free-capacity data when the free-capacity data on the recording medium is stored in the nonvolatile memory independently.

2. Description of the Related Art

In the past, recording devices including a digital video camera, the digital still camera, and so forth record file data including data on video, a still image, and so forth onto various changeable recording mediums including a memory card, an optical disk, and so forth. Therefore, when a recording medium is loaded into the above-described recording device and the power of the recording device is turned on, the recording device detects data on the free capacity of the recording medium and records the file data of various types onto the recording medium only when the recording medium has enough free capacity.

Japanese Unexamined Patent Application Publication No. 2005-228380 discloses a method of using the free capacity of the recording medium for data backup in combination with an auxiliary memory.

When detecting the free-capacity data on the recording medium, an entire file-allocation table relating to a file-management system of the recording medium should be searched. In that case, the time required to detect the free-capacity data increases by as much as the time required to make the search. Thus, the above-described recording device has to wait until the recording device becomes capable of recording data after the power is turned on by as much as the time required to detect the free-capacity data.

The above-described problem can be solved by providing the nonvolatile memory in the recording device independently and storing and holding the free-capacity data on the recording medium in the nonvolatile memory.

FIG. 9 shows a flowchart illustrating processing procedures performed by the recording device when the power is turned on, where the free-capacity data on the recording medium is stored in the nonvolatile memory. In that case, when the power is turned on, a controller which controls operations of the recording device advances from step SP1 to step SP2 where the controller starts the recording medium. Then, at step SP3, the controller determines whether or not the recording medium is replaced with another recording medium. For making the determination, a switch is used, so as to switch a contact point to another contact point by being triggered by mounting and/or removal of the recording medium onto and/or from the recording device. Namely, the determination is made by determining whether or not the contact point is switched to another contact point through the switch when the power is turned off. Thus, the controller is triggered by the switch of the contact point to start the operations of the recording device. Further, information about the contact-point switch is stored and held in the nonvolatile memory.

When a negative result is obtained, at step SP3, the controller advances from step SP3 to step SP4 so that the controller acquires information about free space of the recording medium from the nonvolatile memory and detects the free-capacity data on the recording medium. Then, at step SP5, the controller determines whether or not the recording medium has free capacity sufficient for recording file data including information about an image-pickup result or the like. When a negative result is obtained, at step SP5, the controller advances from step SP5 to step SP6 so that the controller notifies a user that the recording medium does not have the sufficient free space by displaying a message, for example, so as not to accept a photographing operation performed by the user.

On the contrary, if a positive result is obtained, at step SP5, the controller advances from step SP5 to step SP7 so that the controller sets an operation, so as to accept the photographing operation performed by the user. Then, at step SP8, the controller determines whether or not the user instructs to start photographing. If a negative result is obtained, at step SP8, the controller performs the processing corresponding to step SP8 again. On the contrary, if a positive result is obtained, at step SP8, the controller advances from step SP8 to step SP9 so that the controller starts performing a series of processing procedures relating to the photographing and records information about an image-pickup result onto the recording medium. Further, the controller updates the free-capacity data stored in the nonvolatile memory on the basis of the recorded image-pickup-result information.

On the other hand, when a positive result is obtained, at step SP3, the controller advances from step SP3 to step SP10 so that the controller waits until operations of the recording medium are started. After the operations of the recording medium are started, the controller detects information about the free space of the recording medium by using the file-management system of the recording medium and stores the free-space information in the nonvolatile memory, at step SP11. Then, the controller proceeds to step SP5. The above-described configuration allows for reducing the time required to start the recording device.

In the case where a device which stores the free-capacity data on the recording medium in the nonvolatile memory is used, where it is difficult to replace the recording medium with another recording medium, the processing corresponding to steps SP3, SP10, and SP11 can be omitted. Subsequently, the time required to start the device can be reduced by performing simple processing.

However, when the free-capacity data on the recording medium is stored and held in the nonvolatile memory over a long period of time, the free-capacity data may be garbled due to static electricity or the like. In that case, the value of the free-capacity data stored in the nonvolatile memory becomes different from that of real free capacity of the recording medium. Further, it becomes difficult to access the recording medium correctly depending on the free-capacity data stored in the nonvolatile memory, which hampers file recording even though the recording medium has free space.

The above-described recording device can be connected to an external device and/or apparatus such as a computer and used, as storage of the external device and/or apparatus. In that case, the external device and/or apparatus controls the file-management system of the recording medium. Therefore, the external device and/or apparatus accesses the recording medium irrespective of the free-capacity data stored in the nonvolatile memory. Subsequently, in the case where it is difficult to replace the recording medium with another recording medium, the value of the free-capacity data stored in the nonvolatile memory becomes different from that of the real free capacity of the recording medium due to the access to the recording medium, the access being made under the control of the external device and/or apparatus.

In that case, it becomes difficult for the above-described recording device to access the recording medium correctly depending on the free-capacity data stored in the nonvolatile memory.

SUMMARY OF THE INVENTION

Accordingly, the present invention provides a recording device, a recording-medium-management method, a program of the recording-medium-management method, and a recording medium recorded with the program of the recording-medium-management method that allow for accessing the recording medium on the basis of free-capacity data on the recording medium when the free-capacity data is stored in a nonvolatile memory independently.

A recording device according to an embodiment of the present invention is configured to record desired data onto a recording medium. The recording device includes a nonvolatile memory which stores and holds data on a free capacity of the recording medium, and a control unit which controls the recording of the desired data onto the recording medium. The control unit determines the free-capacity data stored in the nonvolatile memory based on the total capacity of the recording medium when power is turned on. When a result of the determination indicates that a value of the free-capacity data stored in the nonvolatile memory does not exceed a value of the total capacity of the recording medium, the control unit records the desired data onto the recording medium with reference to the free-capacity data stored in the nonvolatile memory. When the power is turned off, the control unit updates the free-capacity data stored in the nonvolatile memory so as to reduce the value of the free-capacity data stored in the nonvolatile memory by as much as an amount of the desired data recorded onto the recording medium.

A recording-medium management method according to another embodiment of the present invention is used for a recording device which records desired data onto a recording medium. The recording device includes a nonvolatile memory which stores and holds data on a free capacity of the recording medium. The recording-medium management method includes checking whether a value of the free-capacity data stored in the nonvolatile memory does not exceed a value of the total capacity of the recording medium when power is turned on; recording the desired data onto the recording medium with reference to the free-capacity data stored in the nonvolatile memory when it is determined that the value of the free-capacity data stored in the nonvolatile memory does not exceed the value of the total capacity of the recording medium; and updating the free-capacity data stored in the nonvolatile memory when the power is turned off so as to reduce the value of the free-capacity data stored in the nonvolatile memory by as much as an amount of the desired data recorded onto the recording medium.

According to another embodiment of the present invention, there is provided a program for causing a calculation-processing unit to execute a recording-medium-management method used for a recording device which records desired data onto a recording medium. The recording device includes a nonvolatile memory which stores and holds data on a free capacity of the recording medium, and the recording-medium management method includes checking whether a value of the free-capacity data stored in the nonvolatile memory does not exceed a value of the total capacity of the recording medium when power is turned on; recording the desired data onto the recording medium with reference to the free-capacity data stored in the nonvolatile memory when it is determined that the value of the free-capacity data stored in the nonvolatile memory does not exceed the value of the total capacity of the recording medium; and updating the free-capacity data stored in the nonvolatile memory when the power is turned off so as to reduce the value of the free-capacity data stored in the nonvolatile memory by as much as an amount of the desired data recorded onto the recording medium.

According to another embodiment of the present invention, there is provided a recording medium recorded with a program for causing a calculation-processing unit to execute a recording-medium-management method used for a recording device which records desired data onto a recording medium. The recording device includes a nonvolatile memory which stores and holds data on a free capacity of the recording medium, and the recording-medium management method includes checking whether a value of the free-capacity data stored in the nonvolatile memory does not exceed a value of total capacity of the recording medium when power is turned on; recording the desired data onto the recording medium with reference to the free-capacity data stored in the nonvolatile memory when it is determined that the value of the free-capacity data stored in the nonvolatile memory does not exceed the value of the total capacity of the recording medium; and updating the free-capacity data stored in the nonvolatile memory when the power is turned off so as to reduce the value of the free-capacity data stored in the nonvolatile memory by as much as an amount of the desired data recorded onto the recording medium.

Thus, according to the above-described embodiment, the recording device configured to record the desired data onto the recording medium includes the nonvolatile memory which stores and holds the data on the free capacity of the recording medium, and the control unit which controls the recording of the desired data onto the recording medium. Further, the control unit determines the free-capacity data stored in the nonvolatile memory based on the total capacity of the recording medium when the power is turned on. Still further, when the determination result indicates that the value of the free-capacity data stored in the nonvolatile memory does not exceed the value of the total capacity of the recording medium, the control unit records the desired data onto the recording medium with reference to the free-capacity data stored in the nonvolatile memory. Still further, when the power is turned off, the control unit updates the free-capacity data stored in the nonvolatile memory so as to reduce the value of the free-capacity data stored in the nonvolatile memory by as much as the amount of the desired data recorded onto the recording medium. Accordingly, it becomes possible to store the free-capacity data of the recording medium in the nonvolatile memory independently, reduce the time required to start the recording device by using the stored free-capacity data, determine whether the free-capacity data is wrong with facility, and start recording data. Thus, when the free-capacity data for the recording medium is stored in the nonvolatile memory independently, it becomes possible to access the recording medium correctly on the basis of the free-capacity data.

Thus, it becomes possible to provide the recording-medium-management method, the program of the recording-medium-management method, and the recording medium recorded with the program of the recording medium-management method that are configured according to the above-described embodiments so that correct access can be made to the recording medium on the basis of information about the capacity of free space of the recording medium, when the free-space-capacity information is stored in the nonvolatile memory independently.

When data on the free capacity of a recording medium is stored in a nonvolatile memory independently, the present invention allows for accessing the recording medium correctly on the basis of the free-capacity data.

BRIEF DESCRIPTION OF THE DRAWINGS

FIG. 3 is a flowchart showing processing procedures performed by the CPU provided in the digital still camera shown in FIG. 2 when the power of the digital still camera is turned on;

DETAILED DESCRIPTION

Hereinafter, embodiments of the present invention will be described with reference to the attached drawings, as required.

FIRST EMBODIMENT (1) The Configuration of First Embodiment

Figure 2:
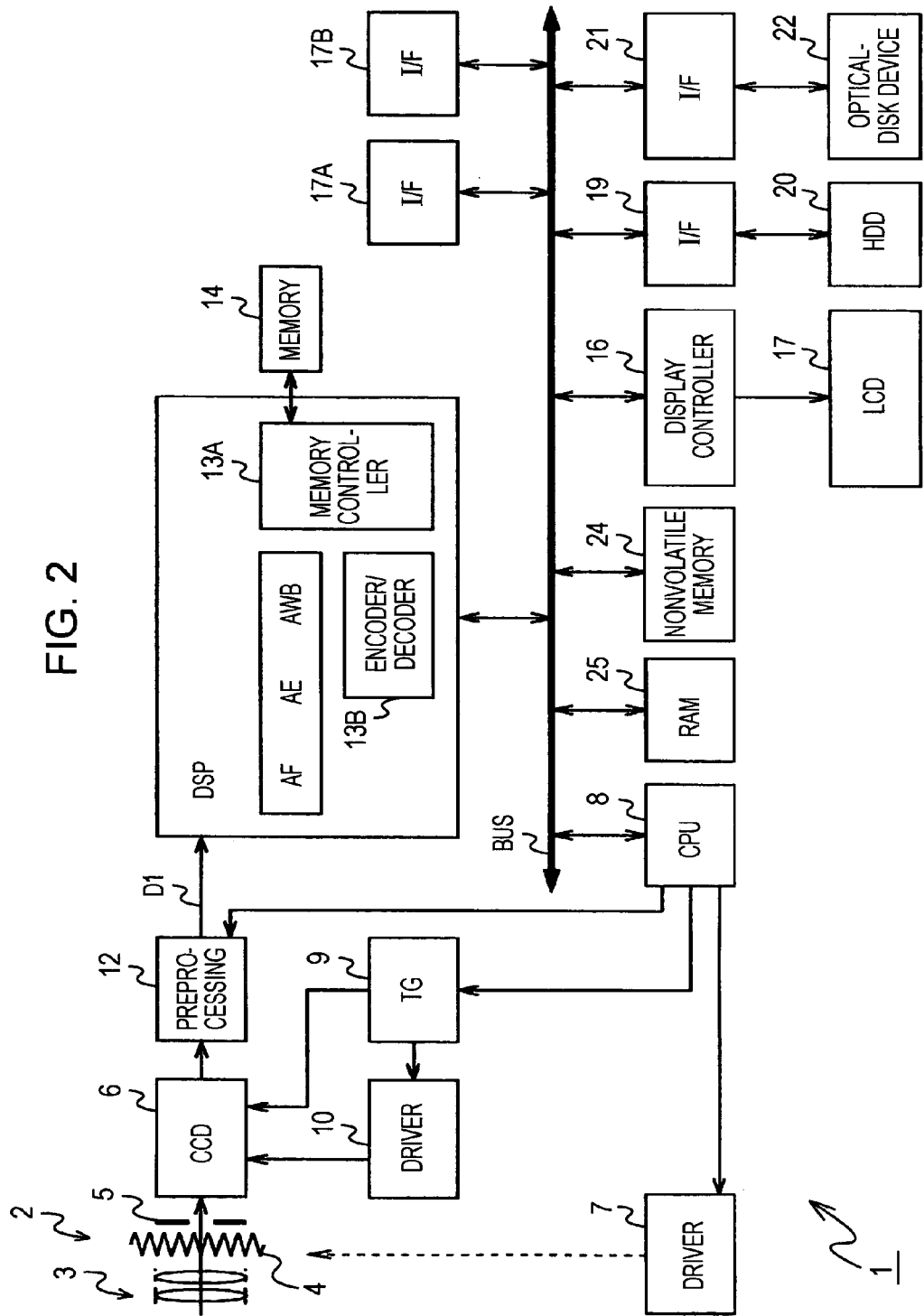
FIG. 2 is a block diagram illustrating the digital still camera according to the above-described embodiment.

FIG. 2 is a block diagram showing a digital still camera 1 according to a first embodiment of the present invention. In the digital still camera 1, an optical system 2 condenses incident lights onto an image-pickup surface of a charge-coupled-device (CCD) solid-state imaging element 6 by using a lens block 3 via a shutter 4 and an aperture 5 so that an optical image of a subject is generated on the image-pickup surface. A driver 7 operates a focus ring and a zoom ring of the lens block 3, the shutter 4, and the aperture 5 according to an instruction transmitted from a central-processing unit (CPU) 8.

A timing generator (TG) 9 generates and outputs various types of reference signals necessary to operate the digital still camera 1 and a driver 10 operates the CCD solid-state imaging element 6 on the basis of the reference signal generated by the timing generator 9. Being driven by the driver 10, the CCD solid-imaging element 6 outputs an image-pickup signal generated, as a result of picking up the optical image generated on the image-pickup surface. A preprocessing circuit 12 subjects the image-pickup signal to correlated-double-sampling (CDS) processing and automatic-gain-control (AGC) processing. Further, the preprocessing circuit 12 subjects the image-pickup signal to analog-to-digital conversion processing and outputs image data D1.

A digital-signal processor (DSP) 13 acquires information necessary to perform auto-focus (AF) adjustment and auto-iris (AI) adjustment by processing the image data D1 output from the preprocessing circuit 12, and outputs the acquired information to the CPU 8. By using the information, the digital still camera 1 controls operations of the driver 7 through the CPU 8, and performs the AF adjustment and the AI adjustment. Further, a digital-signal processor 13 performs auto-white-balance (AWB) adjustment for the image data D1 and outputs the image data D1 to a bus BUS.

Further, when an image-pickup result including video data is recorded under the control of the CPU 8, a memory controller 13A uses a memory 14, as a buffer memory, compresses image data obtained by performing the AWB adjustment by using an encoder/decoder 13B, and outputs encoded data obtained through the data compression to the bus BUS. Still further, when an image-pickup result including data on a still image is recorded, a user operates a shutter button so that the memory controller 13A stores the image data D1 obtained through the AWB adjustment in the memory 14 and the stored image data D1 is output to the bus BUS. Further, the user issues an instruction to record data, the image data D1 held in the memory 14 is read by the memory controller 13A and compressed by the encoder/decoder 13B, and encoded data obtained, as the result of the data compression, is output to the bus BUS.

Further, during data reproduction, encoded data transmitted via the bus BUS, as video and/or a still image, is expanded by the encoder/decoder 13B so that image data is generated. Then, the image data is output to the bus BUS. The memory 14 is generated, as a synchronous-dynamic-random-access memory (SDRAM), for example.

A display controller 16 drives a liquid-crystal-display (LCD) panel 17 by using image data obtained, as the image-pickup result, and image data used for displaying images of various menus that are output to the bus BUS. Subsequently, the digital still camera 1 displays images of the image-pickup result and the various menus.

Each of interfaces (I/F) 17A and 17B is provided, as a network interface that is connected to a network and that transmits various data items output to the bus BUS to the network. Further, each of the I/Fs 17A and 17B outputs various data items transmitted from the network to the bus BUS. Subsequently, the digital still camera 1 can be connected to an external device and/or apparatus such as a computer so that the computer can access a recording medium.

Under the control of the CPU 8, the control being performed according to settings made by the user, an interface (I/F) 19 outputs encoded data, various commands, and so forth that are output to the bus BUS to a hard-disk device (HDD) 20, and outputs a response and reproduction data that are transmitted from the HDD 20 to the bus BUS. The HDD 20 includes at least one recording medium provided in the digital still camera 1 and transmits a response to each of various commands transmitted from the I/F 19. Further, the HDD 20 records various data items transmitted from the I/F 19, reproduces the recorded various data items, and outputs the data items to the I/F 19. Subsequently, in the digital still camera 1, information about the image-pickup result including the video data and/or the still-image data, and data transmitted from the external apparatus such as the computer are recorded onto the internal recording medium. Further, the recorded image-pickup-result information and various data are reproduced.

Under the control of the CPU 8, the control being performed according to the settings made by the user, an interface (I/F) 21 outputs encoded data, various commands, and so forth that are output to the bus BUS to an optical-disk device 22, and outputs a response, reproduction data, and so forth that are transmitted from the optical-disk device 22 to the bus BUS. The optical-disk device 22 transmits a response to various commands transmitted from the I/F 19, records various data items transmitted from the I/F 19 onto an optical disk, reproduces the various data items recorded onto the optical disk, and outputs the reproduced various data items to the I/F 19. Subsequently, in the digital-still camera 1, the image-pickup result including the video data and/or the still-image data, and data transmitted from the external apparatus such as the computer are recorded onto the optical disk, which is a changeable recording medium. Further, the recorded image-pickup-result information and various data items are reproduced.

A nonvolatile memory 24 includes a flash memory, for example. Under the control of the CPU 8, the nonvolatile memory 24 stores and holds data on free capacity of at least one optical disk held in the optical-disk device 22. Further, the nonvolatile memory 24 notifies the CPU 8 of the held free-capacity data.

The CPU 8 is a control unit controlling the entire operations performed in the digital still camera 1. Namely, the CPU 8 controls each of units of the digital still camera 1 in response to an operation performed by the user by preparing a work area in a random-access memory (RAM) 25 and executing a program stored in a predetermined memory (not shown). That is to say, the CPU 8 starts performing operations when the user turns on a power switch so that each of the units starts performing operations. Further, the CPU 8 controls operations performed by a digital-signal processor 13 or the like according to an operation performed by the user. Subsequently, the CPU 8 acquires information about an image-pickup result including video data and/or still-image data, and records the image-pickup-result information onto the HDD 20 and/or the optical disk. Further, the CPU 8 reproduces the recorded image-pickup-result information including the video data and/or the still-image data and makes the liquid-crystal display panel 17 display the image-pickup result. Still further, the image-pickup-result information including the video data and/or the still-image data is downloaded between the HDD 20 and the optical disk device 22, and the image-pickup-result information recorded onto the HDD 20 and the optical-disk device 22 are transmitted to the network via the I/Fs 17A and 17B. Still further, when being connected to the external device and/or apparatus such as the computer via the I/Fs 17A and 17B, the CPU 8 gives the right to access the HDD 20 and/or the optical-disk device 22 to the external device and/or apparatus so that various data items can be transmitted and/or received between the external device and/or apparatus, and the HDD 20 and/or the optical-disk device 22 under the control of the external device and/or apparatus.

Further, when the power is turned off according to an operation performed by the user and information indicating that the optical disk is discharged and/or mounted by turning a switch provided on the optical-disk device 22 on and/or off is detected while the power is turned off, the CPU 8 starts the operations temporarily and stores the information indicating that the optical disk is discharged and/or mounted in the nonvolatile memory 24. Thus, the CPU 8 can detect information indicating that the optical disk is replaced with another optical disk after the power is turned on.

When performing the above-described processing, the CPU 8 is triggered by the power which is turned on to make the HDD 20 and/or the optical-disk device 22 acquire data on a file-allocation table necessary to manage files and expand the file-allocation-table data into the RAM 25 in parallel with various types of processing performed in relation to the power-start time. The various types of processing will be described later. Further, the CPU 8 issues a write command and/or a read command to the HDD 20 and/or the optical-disk device 22 on the basis of the file-management data expanded in the above-described manner. Further, the CPU 8 records and/or deletes data onto and/or from the HDD 20 and the optical-disk device 22, for example, so as to update the file-allocation-table data expanded onto the RAM 25 and updates the data recorded onto the HDD 20 and/or the optical-disk device 22 so that the updated data corresponds to the updated file-allocation-table data.

Further, data on free capacity of the HDD 20 and an optical device loaded into the optical-disk device 22 is loaded from the nonvolatile memory 24, and stored and held in the RAM 25 when the power is turned on. Then, a series of processing procedures are performed so that the held free-capacity data is updated, and written back into the nonvolatile memory 24 when the power is turned off.

On the other hand, when various data items recorded onto the HDD 20 and/or the optical-disk device 22 are recorded and/or reproduced, for example, by using the external device and/or apparatus such as the computer, the external device and/or apparatus is connected to the digital still camera 1 so that the file-allocation-table data is acquired and output to the external device and/or apparatus. Then, the external device and/or apparatus performs file management so that the various data items are recorded and/or deleted, for example. Further, the external device performs control so that the file-allocation-table data recorded onto the HDD 20 and/or the optical disk is updated.

Figure 1:
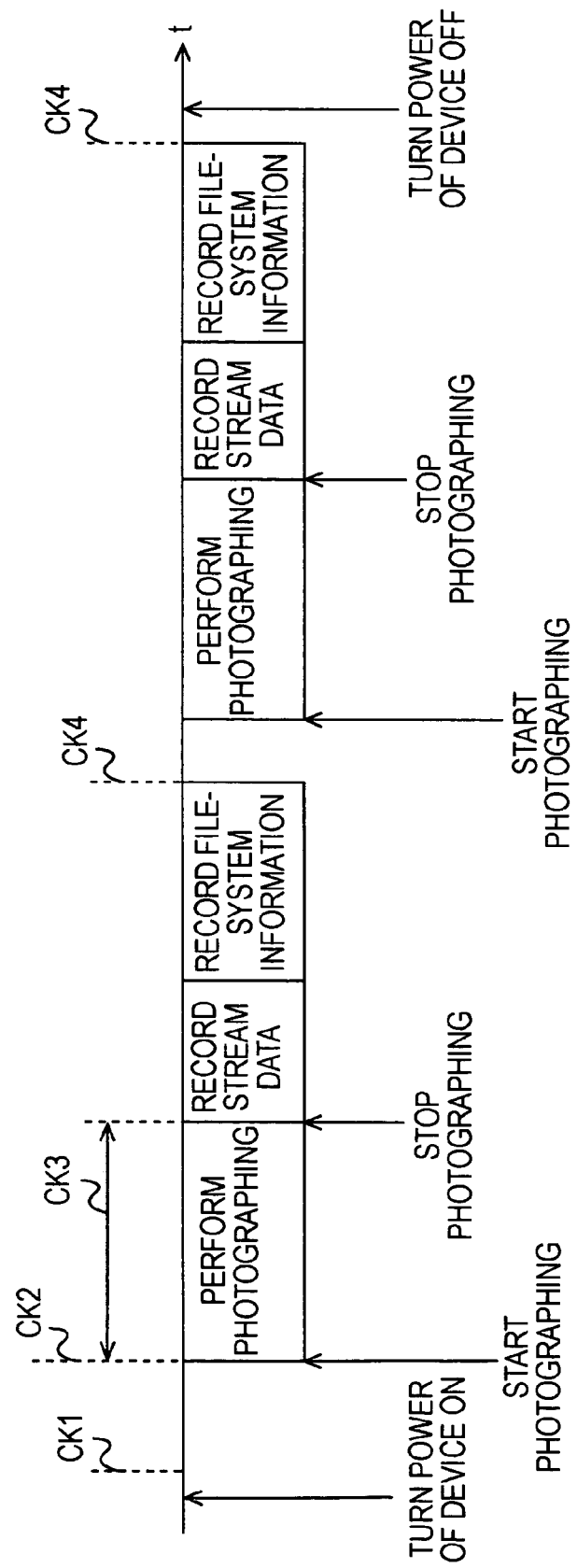
FIG. 1 is a time chart showing processing procedures performed by a central-processing unit (CPU) provided in a digital still camera according to an embodiment of the present invention.

FIG. 1 is a time chart illustrating processing performed by the CPU 8 during the period from when the power is turned on to when the power is turned off, the processing relating to the above-described series of processing procedures. The CPU 8 starts performing operations when the power switch is operated, acquires information about an image-pickup result in response to an operation of an operator, the operation being performed by the user, records the acquired image-pickup-result information onto a recording medium, and updates file-system information of the recording medium so that the updated file-system information corresponds to the image-pickup-result information. Further, the CPU 8 turns the power off according to an operation of the power switch, the operation being performed by the user. Further, FIG. 1 shows processing performed for the image-pickup-result information when the image-pickup-result information includes still-image data. However, when the image-pickup-result information includes video data, stream data is recorded while the image-pickup-result information is acquired.

The CPU 8 stores the free-capacity data item of each of the HDD 20 and the optical disk over and over again at a plurality of positions on the nonvolatile memory 24. Further, the CPU 8 confirms the match between the free-capacity data items by performing start-processing procedures when the power is turned on, so as to check the free-capacity data recorded onto the nonvolatile memory 24. Thus, the CPU 8 checks the free-capacity data stored in the nonvolatile memory 24 by performing so-called double-data writing. In FIG. 1, the checking achieved by performing the double-data writing is indicated by reference number CK1. In the above-described embodiment, the number of the plurality of positions is determined to be two. When data is recorded by performing the above-described double-data writing, it is preferable that the data is recorded onto different areas of the nonvolatile memory 24. Further, it is more preferable that the data is recorded onto the nonvolatile memory 24 and a memory other than the nonvolatile memory 24. Still further, an error-correction signal may be set and recorded, so as to detect an error by using the error-correction signal.

Further, after the start-processing procedures are performed, a program used for checking the free-capacity data by using total-capacity data is executed. Subsequently, the free-capacity data stored in the nonvolatile memory 24 is checked on the basis of the total capacity of each of the HDD 20 and the optical disk. In FIG. 1, the checking performed on the basis of the total-capacity data is indicated by reference number CK2.

If it is determined that the free-capacity data stored in the nonvolatile memory 24 is abnormal through the checking CK2 performed on the basis of the total-capacity data, the CPU 8 detects data on the free capacity on the basis of the background while recording information about the image-pickup result, so that the abnormal free-capacity data on the optical disk and/or the HDD 20 is detected. In FIG. 1, the free-capacity detection performed on the basis of the background is indicated by reference numeral CK3.

Further, as designated by reference numeral CK4, unique-calculation processing is performed every time file data including the image-pickup-result information is recorded, so as to confirm the free-capacity data stored in the nonvolatile memory 24.

Further, when the power is turned off, the free-capacity data of which value is changed due to the series of processing procedures is written back into the nonvolatile memory 24.

Figure 3:
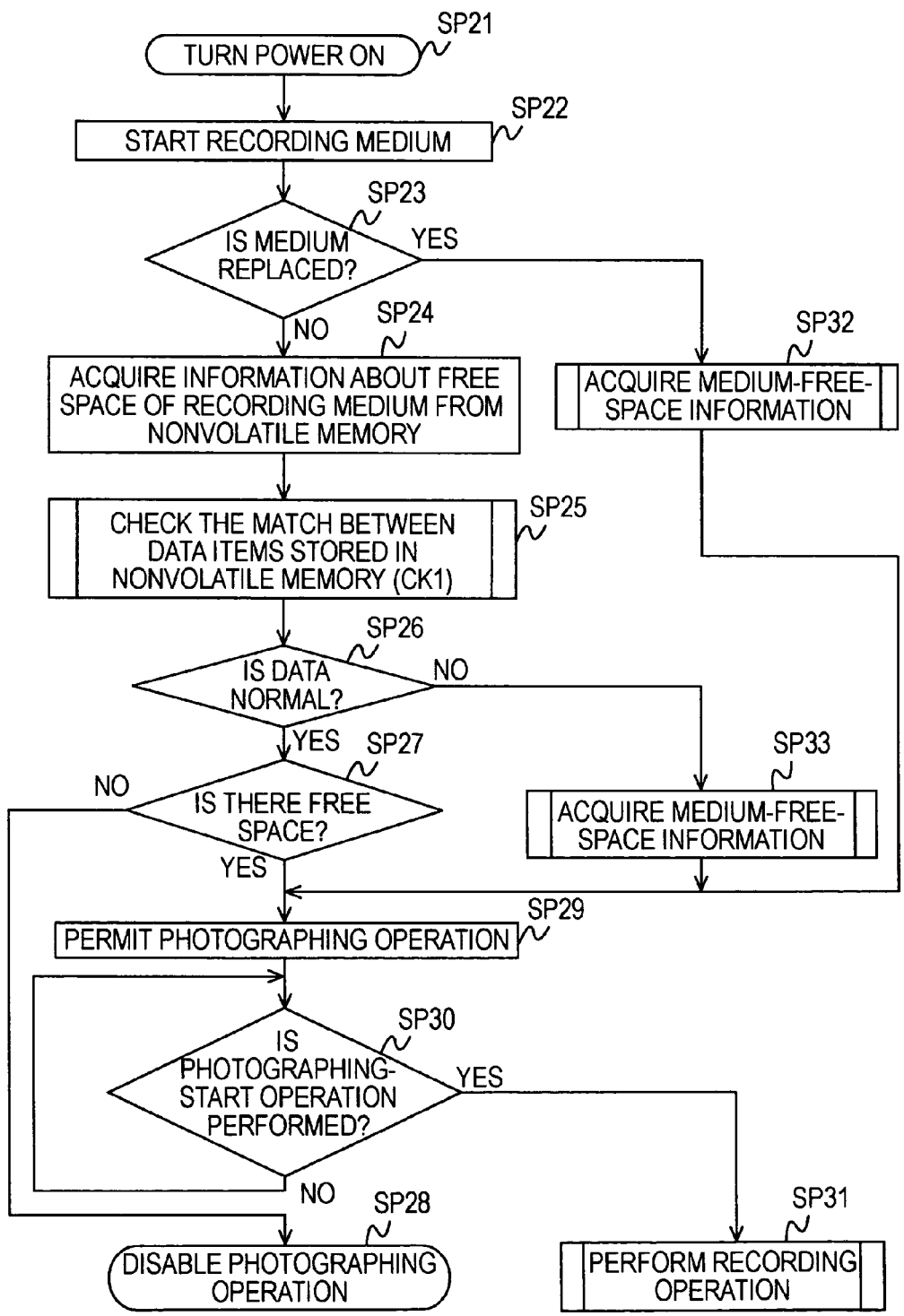
Figure 9:
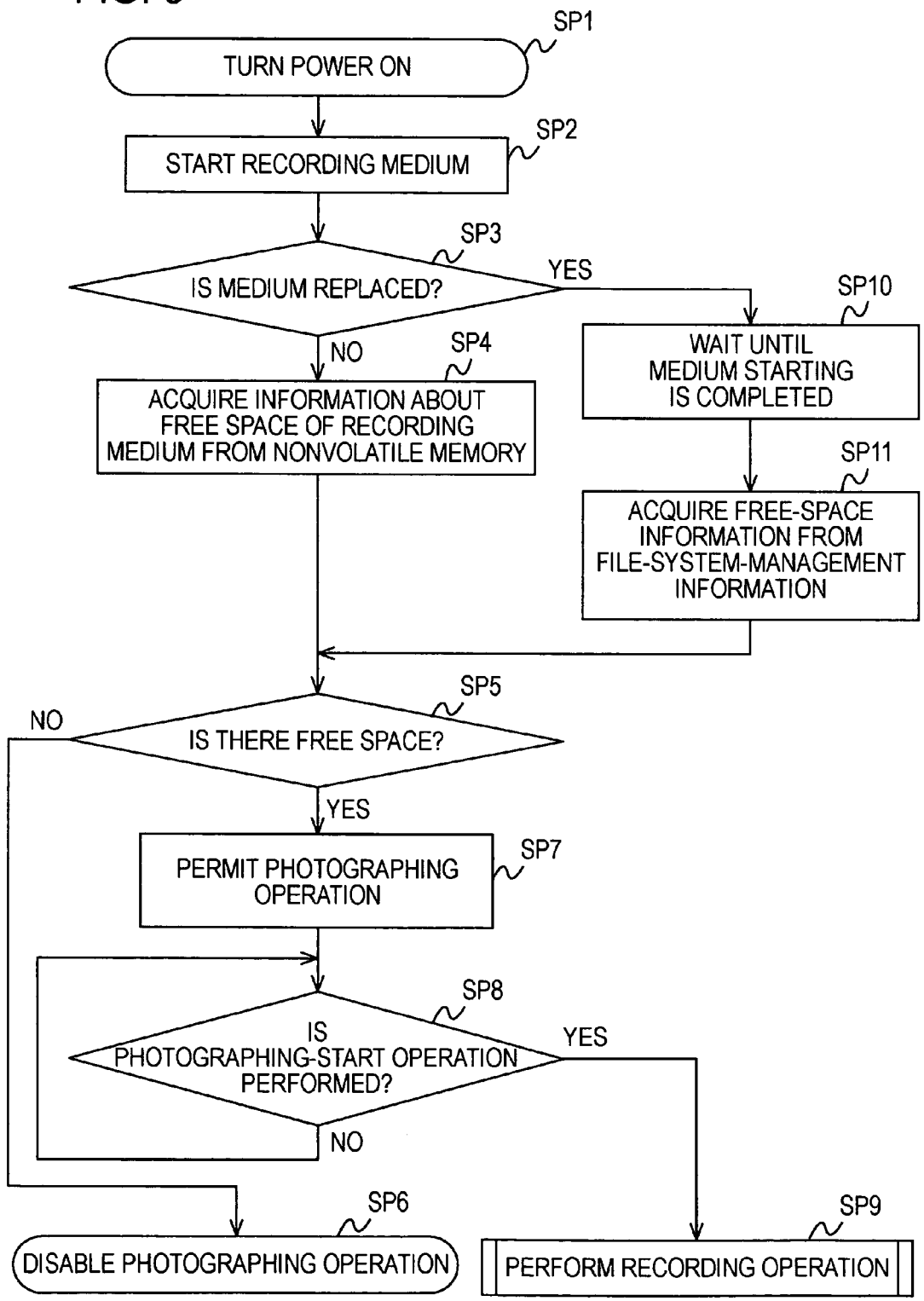
FIG. 9 is a flowchart showing processing procedures performed by a recording device, where the processing procedures may be performed when information about free capacity of a recording medium is stored in a nonvolatile memory.

FIG. 3 is a flowchart showing the start-processing procedures described with reference to FIG. 1. Further, FIG. 3 shows processing relating to the optical disk loaded into the optical-disk device 22. When the power is started, the CPU 8 advances from step SP21 to step SP22, so as to start the optical-disk device 22. Then, at step SP23, the CPU 8 determines whether or not the optical disk is replaced with another optical disk in the optical-disk device 22 during the period from when the power is turned off last to when the power is turned on. The above-described determination is made in the same manner as that described with reference to FIG. 9.

When a negative result is obtained, at step SP23, the recording device advances from step SP23 to step SP24, so as to acquire information about free space of the optical disk from the nonvolatile memory 24. Subsequently, the recording device detects information about the free capacity of the optical disk loaded into the optical-disk device 22. At that time, the CPU 8 detects each of the free-capacity data items recorded at the plurality of positions on the nonvolatile memory 24. Then, at step SP25, the CPU 8 determines whether or not the free-capacity data items match with each other.

When the free-capacity data items recorded at the plurality of positions match with each other, the CPU 8 determines that the free-capacity data stored in the nonvolatile memory 24 is normal, at step SP26, and proceeds to step SP27.

At step SP27, the CPU 8 determines whether or not the free capacity detected, at step SP24, is sufficient enough to record file data including the image-pickup-result information. If data on a still image is recorded, the size of file data including the still-image data is estimated on the basis of the current resolution, settings on data-compression rate, and so forth of the still image, and it is determined whether or not there is enough free capacity for the estimated file size so that it is determined whether or not the free capacity detected, at step SP24, is enough for recording the file data including the image-pickup-result information. On the other hand, if data on video is recorded, it is determined whether or not the free capacity is enough for recording the video over a predetermined time period or more on the basis of a predetermined reference value so that it is determined whether or not the free capacity detected, at step SP24, is enough for recording the file data including the image-pickup-result information.

When a negative result is obtained, at step SP27, the CPU 8 advances to step SP28 and notifies the user that the free capacity is not enough by displaying a message, for example, so as not to accept a photographing operation performed by the user.

On the other hand, when a positive result is obtained, at step SP27, the recording device advances from step SP27 to step SP29, sets an operation, so as to accept the photographing operation performed by the user. Then, at step SP30, the recording device determines whether or not the user instructs to start photographing. If a negative result is obtained, at step SP30, the processing corresponding to step SP30 is performed again. On the other hand, if a positive result is obtained, the recording device advances from step SP30 to step SP31, so as to start performing a series of processing procedures relating to the photographing and record information about an image-pickup result onto a recording medium.

On the other hand, when a positive result is obtained, at step SP23, the recording device advances from step SP23 to step SP32, detects the free space of the optical disk, and proceeds to step SP29. Further, if a negative result is obtained, at step SP26, the recording device advances from step SP25 to step SP33, detects the free space of the optical disk, and proceeds to step SP29.

The CPU 8 performs the above-described processing relating to the optical-disk device 22 in parallel with processing relating to the HDD 20. The processing relating to the HDD 20 is performed, so as to confirm the free-capacity data stored in the nonvolatile memory 24. In that case, since the HDD 20 is included in the digital still camera 1, the CPU 8 omits the processing corresponding to step SP23 shown in FIG. 3 and performs the processing procedures corresponding to steps SP22 and SP24 in sequence, so as to confirm the free-capacity data stored in the nonvolatile memory 24.

Figure 4:
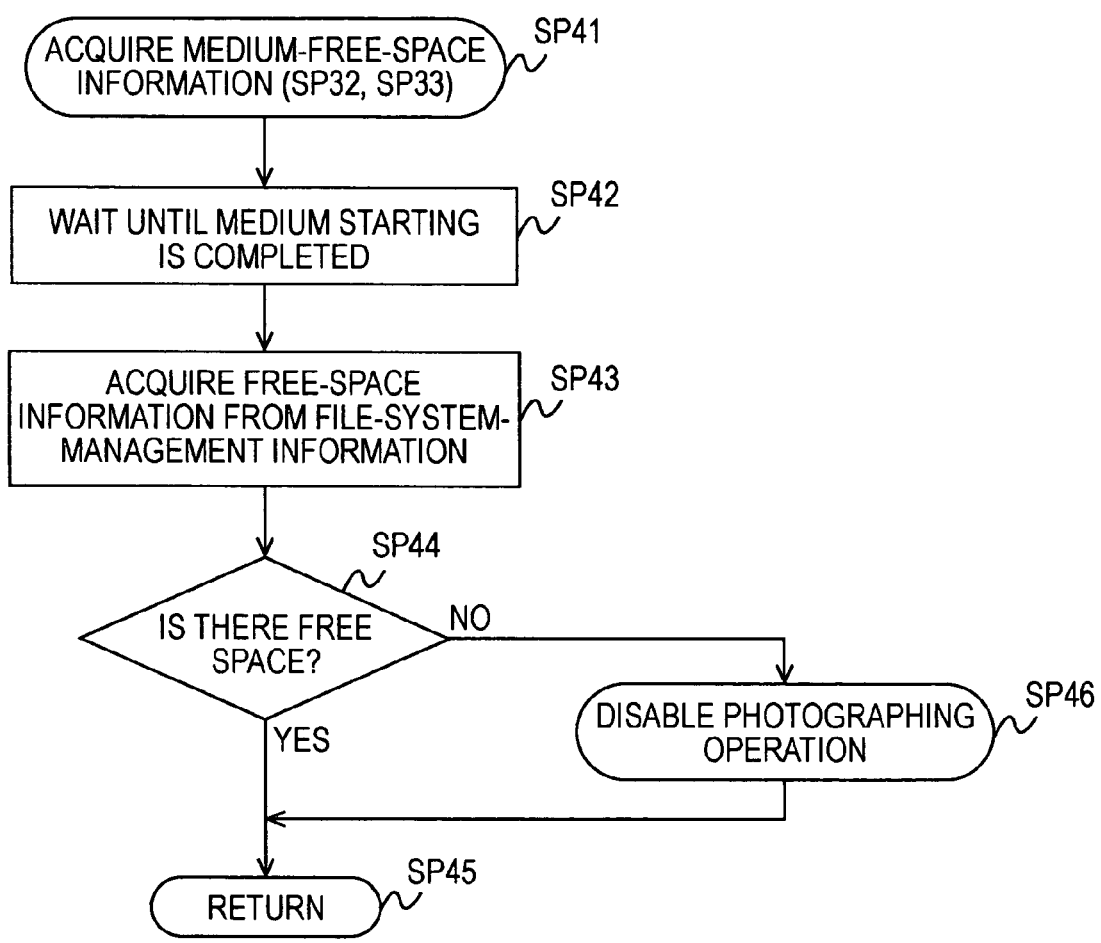
FIG. 4 is a flowchart showing free-space-detection processing included in the processing procedures shown in FIG. 3.

FIG. 4 is a flowchart showing processing procedures relating to steps SP32 and SP33 shown in FIG. 3, where the processing procedures are performed, so as to detect the free capacity. After starting the processing procedures, the CPU 8 advances from step SP41 to step SP42, so as to wait until the optical-disk device 22 finishes starting. When the optical-disk device 22 finishes starting, the CPU 8 acquires the free-space information from a file-management system of the optical-disk device 22, at step SP43. In that case, the CPU 8 searches the free-space information of the file-management system in sequence, the free-space information being read from the optical-disk device 22 and expanded into the RAM 25, and detects data on the free capacity by detecting a cluster set in the free space.

After detecting the free-capacity data in the above-described manner, the CPU 8 updates the free-capacity data relating to the nonvolatile memory 24, the free-capacity data being stored in the RAM 25, on the basis of the detected free-capacity data. Hereinafter, the CPU 8 performs a series of processing procedures on the basis of the above-described updating and free-capacity data.

Then, the CPU 8 proceeds to step SP44 and determines whether or not there is enough free space in the same manner as that used for step SP27. If a positive result is obtained, at step SP44, the CPU 8 proceeds to step SP45 and returns to the original processing procedures. On the other hand, when a negative result is obtained, at step SP44, the CPU 8 notifies the user that the free capacity is not enough by displaying a message, for example, so as not to accept the photographing operation performed by the user.

When confirming the free-capacity data on the HDD 20, the free-capacity data being stored in the nonvolatile memory 24, the CPU 8 performs the free-capacity detection relating to steps SP32 and SP33 by performing the processing procedures shown in FIG. 4.

Figure 5:
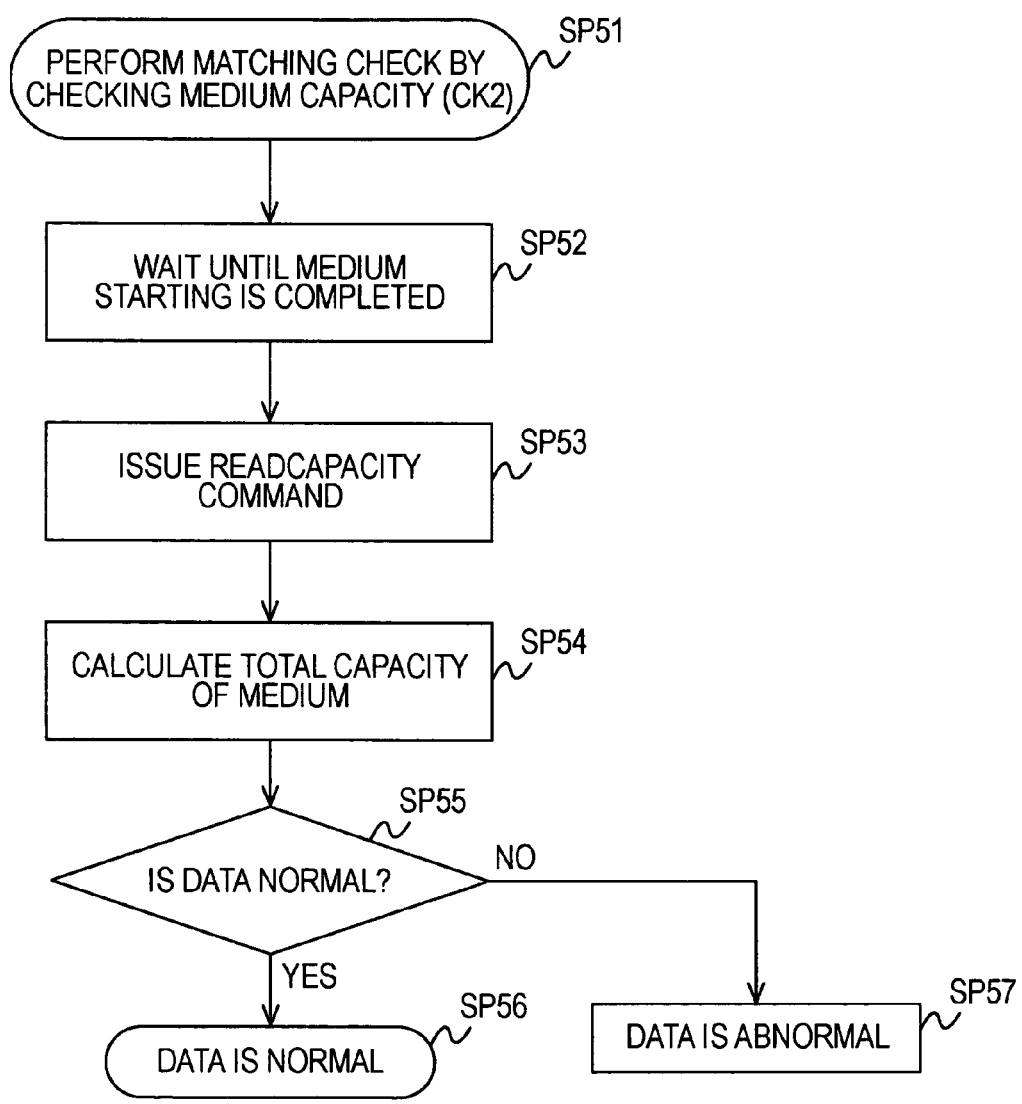
FIG. 5 is a flowchart showing total-capacity-detection processing procedures relating to an AT-attachment-packet-interface (ATAPI) device.

FIG. 5 is a flowchart showing processing procedures performed by the CPU 8, the processing procedures being performed on the basis of the program used for checking the free-capacity data by using data on the total capacity of the optical-disk device 22. The processing procedures shown in FIG. 5 are performed when the optical-disk device 22 is an AT-attachment-packet-interface (ATAPI) device. The CPU 8 advances from step SP51 to step SP52 and waits until the optical-disk device 22 is started. When the optical-disk device 22 is started, the CPU 8 issues a READCAPACITY command, at step SP53. The READCAPACITY command is issued, so as to detect the total capacity of a medium. Then, at step SP54, the CPU 8 detects information about the total capacity of an optical disk loaded into the optical-disk device 22 according to a response from the optical-disk device 22 to the command.

Then, at step SP55, the CPU 8 determines whether or not the total capacity detected, at step SP54, exceeds the free capacity of the optical disk, where data on the free capacity is stored in the nonvolatile memory 24. When a positive result is obtained, at step SP55, the CPU 8 advances from step SP55 to step SP56 and determines the free-capacity data stored in the nonvolatile memory 24 to be normal. Then, the CPU 8 returns to the original processing procedures. On the other hand, when a negative result is obtained, at step SP55, the CPU 8 advances from step SP55 to step SP57 and determines the free-capacity data stored in the nonvolatile memory 24 to be abnormal. Then, the CPU 8 returns to the original processing procedures.

Figure 6:
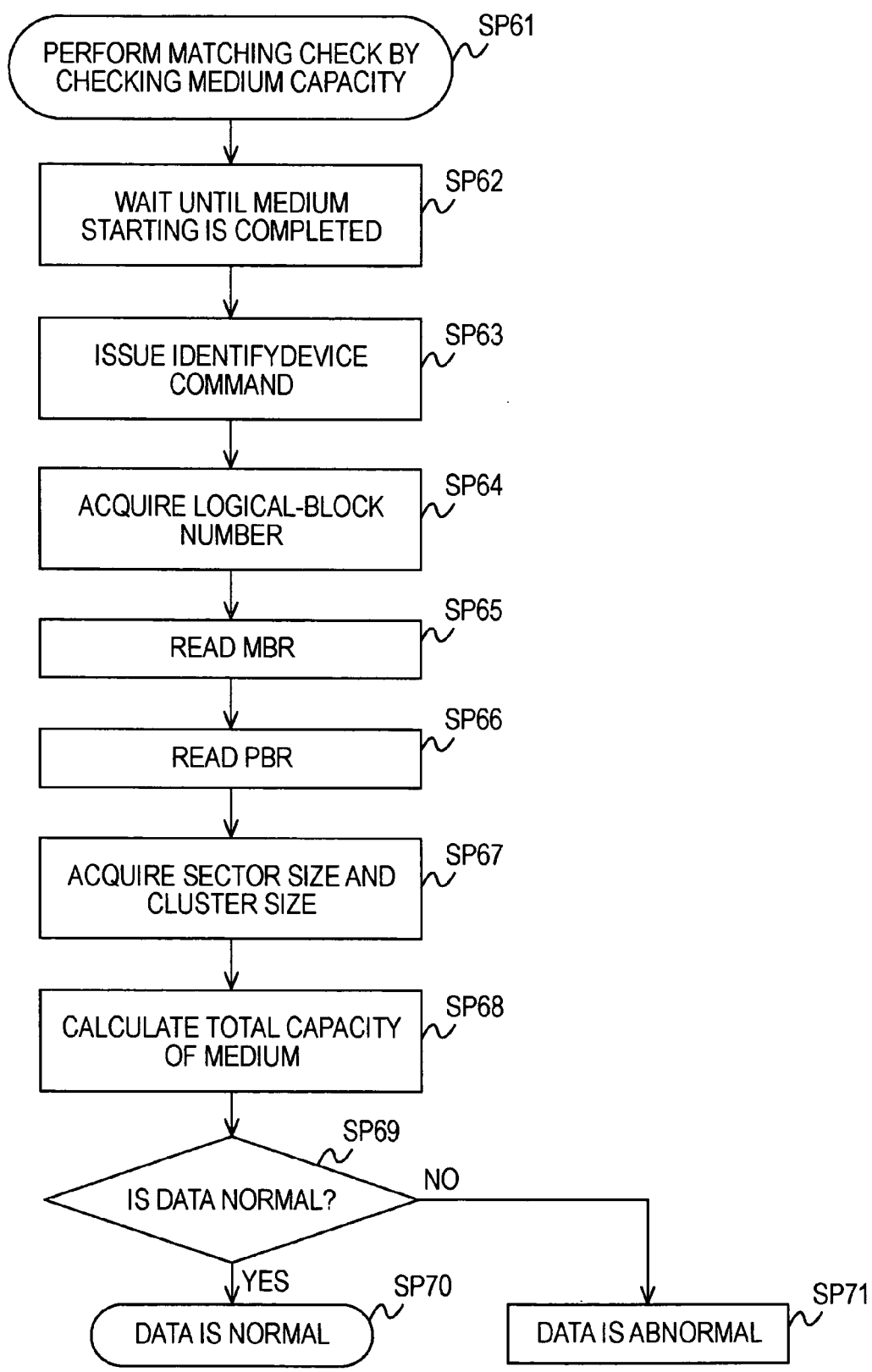
FIG. 6 is a flowchart showing total-capacity-detection processing procedures relating to an AT-attachment (ATA) device.

FIG. 6 is a flowchart showing processing procedures performed by the CPU 8, the processing procedures being performed on the basis of the program used for checking the free-capacity data by using the total-capacity data relating to the HDD 20. The processing procedures shown in FIG. 6 are performed when the HDD 20 is an AT-attachment (ATA) device. The CPU 8 advances from step SP61 to step SP62 and waits until the HDD 20 is started. When the HDD 20 is started, the CPU 8 issues an IDENTIFYDEVICE command, at step SP63. The IDENTIFYDEVICE command is issued, so as to instruct to transmit a notification indicating the logical-block number. Then, at step SP64, the CPU 8 detects information about the number of logical blocks of the HDD 20 according to a response from the HDD 20 to the command. Further, the CPU 8 reads Master Boot Record (MBR) from the HDD 20, at step SP65, and reads Partition Boot Record (PBR), at step SP66. Then, at step SP67, the CPU 8 detects information about the sector size and cluster size of the HDD 20 on the basis of the MBR acquired, at step SP65, and the PBR acquired, at step SP66. Further, at step SP68, the CPU 8 detects data on the total capacity of the HDD 20 on the basis of the logical-block-number information detected, at step SP64.

Then, at step SP69, the CPU 8 determines whether or not the total capacity detected, at step SP68, exceeds the free capacity of the HDD 20, where the data on free capacity is stored in the nonvolatile memory 24. When a positive result is obtained, the CPU 8 advances from step SP69 to step SP70 and determines the free-capacity data stored in the nonvolatile memory 24 to be normal. Then, the CPU 8 returns to the original processing procedures. On the other hand, when a negative result is obtained, at step SP69, the CPU 8 advances from step SP69 to step SP71 and determines the free-capacity data stored in the nonvolatile memory 24 to be abnormal. Then, the CPU 8 returns to the original processing procedures.

Figure 7:
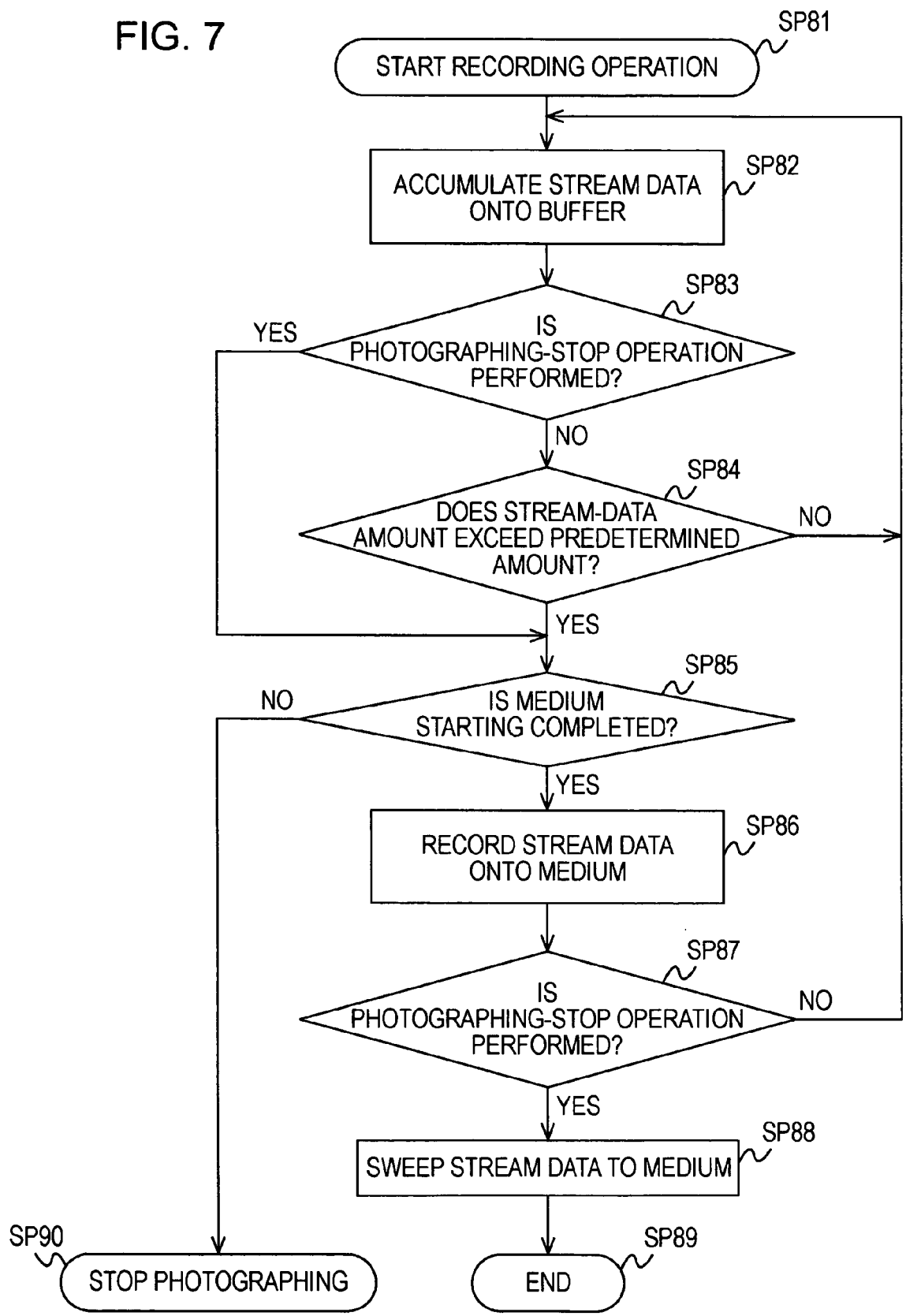
FIG. 7 is a flowchart showing processing procedures performed while photographing is performed.

After confirming the free-capacity data stored in the nonvolatile memory 24, the CPU 8 stores file data including information about an image-pickup result in the HDD 20 and/or the optical-disk device 22 in response to an operation performed by the user by performing processing procedures shown in FIG. 7. The processing procedures shown in FIG. 7 are performed when the image-pickup-result information including video data is stored. The above-described processing procedures are related to step SP31 shown in FIG. 3 and performed for the HDD 20 and/or the optical-disk device 22 to which an instruction to store the image-pickup-result information is issued. The CPU 8 performs the same processing procedures, so as to store the image-pickup-result information including still-image data.

In that case, the CPU 8 advances from step SP81 to step SP82 and accumulates stream data onto the buffer memory according to the image-pickup-result information. Then, at step SP83, the CPU 8 determines whether or not an instruction to stop photographing is issued. When a negative result is obtained, at step SP83, the CPU 8 advances to step SP84, so as to determine whether or not the amount of data accumulated on the buffer memory is equivalent to or larger than a predetermined amount. When a negative result is obtained, at step SP84, the CPU 8 returns to step SP82.

Thus, the CPU 8 waits until the amount of data accumulated onto the buffer memory attains the predetermined amount. When the amount of data accumulated onto the buffer memory attains the predetermined amount, the CPU 8 advances from step SP84 to step SP85 and determines whether or not the optical-disk device 22 and/or the HDD 20 for which an instruction to store the image-pickup-result information is issued finishes starting. When a positive result is obtained, at step SP85, the CPU 8 advances to step SP86 and records the stream data stored in the buffer memory onto a recording medium. Then, at step SP87, the CPU 8 determines whether or not an instruction to finish photographing is issued. When a negative result is obtained, the CPU 8 returns to step SP82. Thus, the CPU 8 records information about image-pickup results acquired in sequence onto the recording medium in the unit of data amount that can be stored in the buffer memory.

On the other hand, when the user issues an instruction to finish photographing, a positive result is obtained, at each of steps SP83 and SP87. When the positive result is obtained, at step SP83, the CPU 8 advances from step SP83 to step SP85. Further, when the positive result is obtained, at step SP87, the CPU 8 advances from step SP87 to step SP88 and records the stream data accumulated onto the buffer memory onto the recording medium. Then, the CPU 8 proceeds to step SP89 and finishes the above-described processing procedures.

On the other hand, when a negative result is obtained, at step SP85, the CPU 8 advances from step SP85 to step SP90 and stops photographing and finishes the processing procedures. In that case, the CPU 8 may wait until the medium finishes starting and advance from step SP85 to step SP86 in place of step SP90.

If it is determined that the free-capacity data stored in the nonvolatile memory 24 is abnormal by performing the processing procedures shown in FIGS. 5 and 6, the CPU 8 performs the above-described processing procedures shown in FIG. 4 on the basis of the background while recording the image-pickup-result information by performing the processing procedures shown in FIG. 7, so that data on the free capacity of the optical disk loaded into the optical-disk device 22 and/or data on the free capacity of the HDD 20 is detected. In that case, the processing corresponding to steps SP44 and SP46 is omitted when the CPU 8 performs the processing procedures shown in FIG. 4 on the basis of the background.

Figure 8:
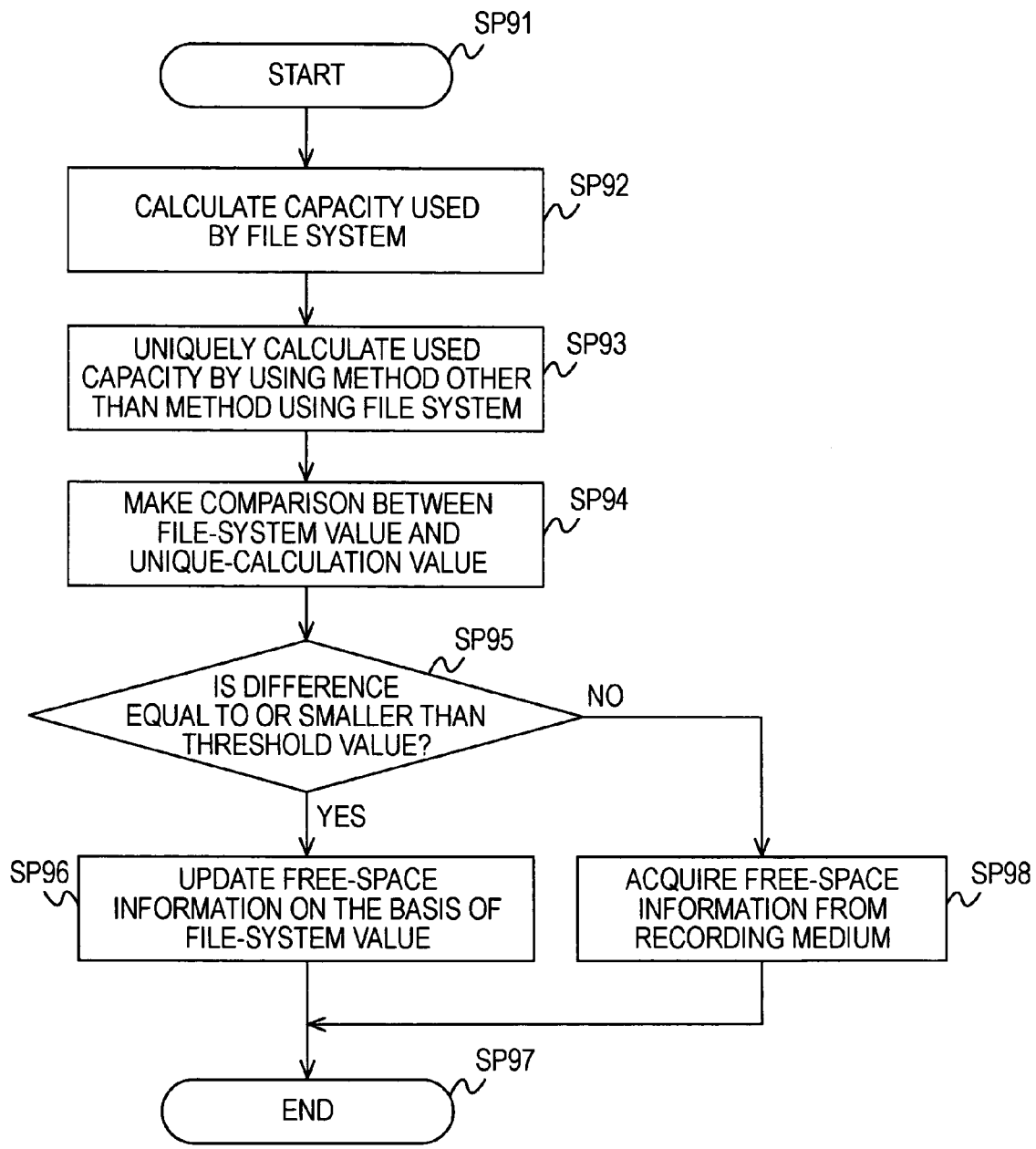
FIG. 8 is a flowchart showing processing procedures performed when file recording is completed.

FIG. 8 is a flowchart showing unique-calculation processing procedures. The CPU 8 finishes storing the image-pickup-result information and updates the file-system information. Then, the CPU 8 starts performing the processing procedures shown in FIG. 8, advances from step SP91 to step SP92, and detects information about the size of file data from the file-management system, the file data including the stored image-pickup-result information. Then, at step SP93, the CPU 8 detects the size of the recorded file data on the basis of the free capacity of the recording medium according to a calculation method performed without using the file-management system. According to the above-described calculation method, the calculation is performed in a layer higher than a layer of the file-management system and/or a layer lower than the layer of the file-management system. In the above-described embodiment, the calculation is performed in the lower layer, so as to detect the file size on the basis of the size of a sector used for recording the above-described file data.

Then, at step SP94, the CPU 8 calculates a difference between the file size detected at step SP92 and that detected at step SP93. Then, at step SP95, the CPU 8 determines whether or not the value of the difference is equivalent to or smaller than a predetermined value, so as to determine whether or not the file-size information detected by the file-management system is reliable. If a positive result is obtained, at step SP95, the CPU 8 advances to step SP96 and updates the free-capacity data relating to the data stored in the nonvolatile memory 24, the free-capacity data being held in the RAM 25, by subtracting the value corresponding to the file size detected by the file-management system from the free-capacity data. Then, the CPU 8 advances to step SP97 and finishes the above-described processing procedures.

On the other hand, if a negative result is obtained, at step SP95, the CPU 8 advances to step SP98, since it is considered that over-write recording or the like was performed. At step SP98, the CPU 8 detects information about the free space of the recording medium by performing the above-described processing procedures shown in FIG. 4. Then, the CPU 8 updates the data stored in the RAM 25 on the basis of the capacity of the free space, that is, the free capacity, and advances to step SP97.

(2) Operations of First Embodiment

In the digital still camera 1 (shown in FIG. 2) having the above-described configuration, the power is turned on in response to the operation performed by the user, and the image-pickup-result information including the video data and/or the still-image data acquired by the CCD solid-state imaging element 6 is processed by the digital-signal processor 13 and stored in the HDD 20 and/or the optical-disk device 22. Further, the image-pickup-result information stored in the HDD 20 and/or the optical-disk device 22 in the above-described manner is reproduced and displayed by the liquid-crystal-display panel 17. Further, the image-pickup-result information is copied between the HDD 20 and the optical-disk device 22. Further, the digital still camera 1 is connected to the external device and/or apparatus via the interfaces 17A and 17B. The external device and/or apparatus accesses the HDD 20 and/or the optical-disk device 22 so that various data items stored in the external device and/or apparatus are stored in the HDD 20 and/or the optical-disk device 22. Further, the data items stored in the HDD 20 and/or the optical-disk device 22 are output to the external device and/or apparatus.

Therefore, when the external device and/or apparatus accesses the HDD 20 and/or the optical-disk device 22, the power is started, so that the file-allocation-table data relating to the file-management system is loaded from the HDD 20 and/or the optical disk loaded into the optical-disk device 22 to the RAM 25. After that, the external device and/or apparatus accesses the HDD 20 and/or the optical-disk device 22 according to the file-allocation-table data. Thus, for recording desired data, the free-capacity data is detected on the basis of the file-allocation-table data loaded in the above-described manner, and the data recording is started. According to the above-described operations, however, it takes too long time to start the power.

Thus, in the digital still camera 1 (FIGS. 1 and 3), data on free capacity of the HDD 20 and/or the optical disk loaded into the optical-disk device 22 is stored and held in the nonvolatile memory 24. Further, when the power is turned on, it is determined whether or not the image-pickup-result information can be stored with reference to the free-capacity data stored and held in the nonvolatile memory 24. When the image-pickup-result information can be stored, storing the image-pickup-result information is started. Further, when the power is turned off, the free-capacity data stored in the nonvolatile memory 24 is updated. Subsequently, in the digital still camera 1, the time required to start the power can be significantly reduced.

However, when the optical disk loaded into the optical-disk device 22 is replaced with a different optical disk, the free-capacity data stored in the nonvolatile memory 24 and data on the free capacity of the different optical disk do not match with each other. Further, when the external device and/or apparatus accesses the optical-disk device 22, data recording, data deletion, and so forth are performed irrespective of the data stored in the nonvolatile memory 24, so that the free-capacity data stored in the nonvolatile memory 24 and that of the optical-disk device 22 do not match with each other. Further, if the data stored in the nonvolatile memory 24 is garbled by static electricity or the like during the period of time from when the power is turned off to when the power is turned on, the free-capacity data stored in the nonvolatile memory 24 and that of the optical-disk device 22 do not match with each other.

Thus, in the digital still camera 1, it is determined whether or not the optical disk of the optical-disk device 22 is replaced with the different optical disk when the power is turned on (see step SP23 shown in FIG. 3). If the optical disk is replaced with the different optical disk, the file-management system of the optical disk detects free capacity of the optical disk (see step SP32 shown in FIG. 3 and processing procedures shown in FIG. 4) and the image-pickup-result information is recorded onto the optical disk on the basis of the free-capacity data. Thus, in the case where an optical disk, which is a replaceable recording medium, is used, the free-capacity data stored in the nonvolatile memory 24 is updated by being triggered by the optical-disk replacement. Subsequently, if the free-capacity data stored in the nonvolatile memory 24 and that of the optical-disk device 22 do not match with each other due to the optical-disk replacement, the garbled data, and access from the external device and/or apparatus, correct access to the optical disk can be made.

Then, when the optical disk is replaced with another optical disk, the free-capacity data can be detected again so that correct access to the optical disk can be made. However, when the optical disk is not replaced, and the free-capacity data stored in the nonvolatile memory 24 and that of the optical-disk device 22 do not match with each other due to the garbled data and the access from the external device and/or apparatus, it becomes difficult to make correct access to the optical disk. Further, since the HDD 20 is provided in the digital still camera 1, it is difficult for the HDD 20 to detect the free-capacity data again by being triggered by the recording-medium replacement, as is the case with the optical-disk device 22. Thus, it becomes difficult to access the optical disk correctly when the free-capacity data stored in the nonvolatile memory 24 and that of the HDD 20 do not match with each other due to the garbled data and the access from the external device and/or apparatus.

Thus, in the digital still camera 1, it is determined that the free-capacity data stored in the nonvolatile memory 24 does not exceed the total capacity of each of the corresponding HDD 20 and optical disk when the power is started (FIGS. 5 and 6). In that manner, in the digital still camera 1, it is easily determined that the free-capacity data stored in the nonvolatile memory 24 is correct. Further, if it is determined that the free-capacity data stored in the nonvolatile memory 24 is correct, the image-pickup-result information is stored by the HDD 20 and/or the optical-disk device 22 with reference to the free-capacity data stored in the nonvolatile memory 24. Subsequently, it becomes possible to access the recording medium correctly on the basis of the free-capacity data when the data on free capacity of the recording medium is stored in the nonvolatile memory 24 independently.

Further, if it is determined that the free-capacity data stored in the nonvolatile memory 24 is wrong during the above-described power-start processing, data on free capacity is acquired by using the file-management system of the recording medium. Then, the image-pickup-result information is stored by the HDD 20 and/or the optical-disk device 22 with reference to the acquired free-capacity data in place of the free-capacity data stored in the nonvolatile memory 24. Subsequently, it becomes possible to record and/or reproduce data through the HDD 20 and/or the optical-disk device 22 even though the data stored in the nonvolatile memory 24 is garbled, for example.

Further, in the digital still camera 1, even though the free-capacity data stored in the nonvolatile memory 24 is determined to be wrong by performing the power-start processing, storing the image-pickup-result information is started for the mean time, and the free-capacity data is acquired through the file-management system of the recording medium on the basis of the background of the stored image-pickup-result information. Subsequently, the digital camera 1 does not miss a chance of photographing, so that the operability thereof increases.

In the digital still camera 1, the free-capacity data is recorded at a plurality of positions on the nonvolatile memory 24 repeatedly. When the above-described power-start processing is performed, it is determined whether or not details on the free-capacity data recorded at the plurality of positions match with each other. Thus, it becomes possible to detect an error occurring in the nonvolatile memory 24 by performing the double-data writing. Therefore, in the digital still camera 1, it is determined whether or not the free-capacity data stored in the nonvolatile memory 24 is wrong by making the above-described simple determination. Subsequently, the precision of the determination increases.

Further, if it is determined that the details on the free-capacity data recorded at the plurality of positions do not match with each other through the above-described double-data-writing determination, the free-capacity data on the recording medium is acquired again and the image-pickup-result information is recorded onto the recording medium with reference to the acquired free-capacity data in place of the free-capacity data stored in the nonvolatile memory 24. Subsequently, it becomes possible to record and/or reproduce data through the HDD 20 and/or the optical-disk device 22 even though the free-capacity data stored in the nonvolatile memory 24 is garbled, for example.

Further, in the digital still camera 1, when the image-pickup-result information is recorded, as a single file, it is determined whether or not the value of difference between the data amount detected on the basis of a file size that can be handled by the file-management system data and the amount of recorded data detected on the basis of the free capacity of the recording medium according to another method is equivalent to or smaller than a predetermined value. If it is determined that the difference value is equivalent to or smaller than the predetermined value, the free-capacity data stored in the nonvolatile memory 24 is updated by as much as the file-size data amount. IF the difference value is larger than the predetermined value, the free-capacity data is detected again by the file-management system and the free-capacity data stored in the nonvolatile memory 24 is updated. Subsequently, even though the image-pickup-result information is over-write recorded, an error in the free-capacity data stored in the nonvolatile memory 24 can be reduced. Further, it becomes possible to deal with garbled data stored in the nonvolatile memory 24 after the power is turned on.

In the digital still camera 1, the free-capacity data stored in the nonvolatile memory 24 is updated on the RAM 25. When the power is turned off, the free-capacity data stored in the nonvolatile memory 24 is ultimately updated. Thus, the data stored in the nonvolatile memory 24 is prevented from being rewritten frequently.

(3) Advantage of First Embodiment

According to the above-described configuration, data on the free capacity of the recording medium is stored in the nonvolatile memory 24 independently. Further, at the start time, the stored free-capacity data is confirmed on the basis of the total capacity of the recording medium and data recording is started. Subsequently, when the free-capacity data on the recording medium is stored in the nonvolatile memory 24 independently, correct access to the recording medium can be made on the basis of the free-capacity data.

Further, when the value of free-capacity data stored in the nonvolatile memory 24 exceeds that of total capacity of the recording medium, data on the free capacity of the recording medium is acquired by the file-management system of the recording medium and the image-pickup-result information is recorded onto the recording medium with reference to the acquired free-capacity data in place of the free-capacity data stored in the nonvolatile memory 24. Subsequently, it becomes possible to record and/or reproduce data correctly even though the data stored in the nonvolatile memory 24 is garbled, for example.

Further, if the value of the free-capacity data stored in the nonvolatile memory 24 exceeds that of total capacity of the recording medium, the processing performed by the file-management system of the recording medium, so as to acquire data on the free capacity of the recording medium, can be performed on the basis of the background. Subsequently, the operability of the digital still camera 1 increases.

Further, the free-capacity data is stored at a plurality of positions on the nonvolatile memory 24 repeatedly, so as to check the free capacity by performing the double-data writing. Subsequently, it becomes possible to determine whether or not the free-capacity data stored in the nonvolatile memory 24 is wrong by making a simple determination on the basis of the total capacity of the recording medium, so that the determination precision increases.

If it is determined that the free-capacity data stored in the nonvolatile memory 24 is wrong by checking the free-capacity data through the double-data writing, the free-capacity data on the recording medium may be acquired by the file-management system, and access to the recording medium may be made with reference to the acquired free-capacity data in place of the free-capacity data stored in the nonvolatile memory 24. In that case, data can be recorded and/or reproduced through the HDD 20 and/or the optical-disk device 22 even though the data stored in the nonvolatile memory 24 is garbled, for example.

Further, when a single data file is recorded, the difference between the amount of data included in the recorded single data file, the data amount being detected by the file-management system, and the amount of data included in the recorded single file, the data amount being detected on the basis of the free capacity without using the file-management system of the recording medium, is determined. When the value of the difference exceeds a predetermined value, data on the free-capacity of the recording medium is detected by the file-management system of the recording medium and determined to be the free-capacity data stored in the nonvolatile memory 24. When the value of the difference is smaller than the predetermined value, the data amount of the recorded single file is subtracted from the value of the free-capacity data stored in the nonvolatile memory 24. Subsequently, even though the data stored in the nonvolatile memory 24 is garbled after the power is turned on, it becomes possible to access the recording medium correctly.

SECOND EMBODIMENT

According to a second embodiment of the present invention, information about a shock caused by a drop or the like is detected by using an acceleration sensor provided in the digital still camera 1 described with reference to FIG. 2. Namely, when the value of acceleration detected by the acceleration sensor is equivalent to and/or larger than a predetermined value and increases abruptly, the CPU 8 determines that an error occurs in the free-capacity data stored in the nonvolatile memory 24 due to the shock, and performs the processing procedures shown in FIG. 4. Further, when a system error occurs, the CPU 8 restarts the entire operations and resets the entire digital still camera 1. In that case, the CPU 8 also determines that an error occurs in the free-capacity data stored in the nonvolatile memory 24 and performs the processing procedures shown in FIG. 4. Further, the CPU 8 manages the free space of each of the HDD 20 and the optical-disk device 22 and records the image-pickup-result information with reference to the free-capacity data detected through the processing procedures shown in FIG. 4.

The above-described embodiment allows for accessing a recording medium correctly by detecting the free-capacity data again by using the file-management system when the drop and/or the error occurs.

THIRD EMBODIMENT

According to a third embodiment of the present invention, when data is stored in the HDD 20 and/or the optical-disk device 22 provided in the digital still camera 1 described with reference to FIG. 2 by using an external device and/or apparatus, and when a recording medium is formatted in the optical-disk device 22, the series of processing procedures shown in FIG. 3 are performed, the processing procedures relating to the recording-medium replacement.

In that case, the power-start processing relating to the nonvolatile memory 24 is performed. Therefore, when data on the free capacity of the recording medium is stored in the nonvolatile memory 24 independently, the external device and/or apparatus can access the recording medium correctly on the basis of the free-capacity data.

FOURTH EMBODIMENT

In the above-described embodiment, the image-pickup-result information is stored by using the HDD 20 and/or the optical-disk device 22. However, the present invention can be used, so as to record image-pickup-result information onto various recording mediums without being limited to the above-described embodiments.

Further, in the above-described embodiments, the image-pickup-result information is recorded onto the recording medium. However, the present invention can be used, so as to record file data including various data items other than the image-pickup-result information onto a recording medium without being limited to the above-described embodiments.

In the above-described embodiments, the present invention is used for a mobile recording device. However, the present invention can be used for a stationary recording device without being limited to the above-described embodiments.

It should be understood by those skilled in the art that various modifications, combinations, sub-combinations and alterations may occur depending on design requirements and other factors insofar as they are within the scope of the appended claims or the equivalents thereof.

The invention claimed is:

1. A recording device which records desired data onto a recording medium, the recording device comprising:
 a nonvolatile memory which stores and holds data on a free capacity of the recording medium; and
 a control unit which controls the recording of the desired data onto the recording medium, wherein the control unit determines status of the free-capacity data stored in the nonvolatile memory, based on the total capacity of the recording medium, when power is turned on, when a result of the determination indicates that a value of the free-capacity data stored in the nonvolatile memory does not exceed a value of the total capacity of the recording medium, the control unit records the desired data onto the recording medium with reference to the free-capacity data stored in the nonvolatile memory, and when the power is turned off, the control unit updates the free-capacity data stored in the nonvolatile memory so as to reduce the value of the free-capacity data stored in the nonvolatile memory by as much as an amount of the desired data recorded onto the recording medium.

2. A recording-medium management method used for a recording device which records desired data onto a recording medium, the recording device including a nonvolatile memory which stores and holds data on a free capacity of the recording medium, the recording-medium management method comprising:

checking whether a value of the free-capacity data stored in the nonvolatile memory does not exceed a value of the total capacity of the recording medium when power is turned on;

recording the desired data onto the recording medium with reference to the free-capacity data stored in the nonvolatile memory when it is determined that the value of the free-capacity data stored in the nonvolatile memory does not exceed the value of the total capacity of the recording medium; and updating the free-capacity data stored in the nonvolatile memory when the power is turned off so as to reduce the value of the free-capacity data stored in the nonvolatile memory by as much as an amount of the desired data recorded onto the recording medium when the power is turned off.

3. The recording-medium management method according to claim 2, further comprising:

performing a first detection procedure to detect the free-capacity data on the recording medium using a file-management system of the recording medium when it is determined that the value of the free-capacity data stored in the nonvolatile memory exceeds the value of the total capacity of the recording medium, wherein, when it is determined that the value of the free-capacity data stored in the nonvolatile memory exceeds the value of the total capacity of the recording medium, the recording step includes recording the desired data onto the recording medium with reference to the free-capacity data detected in the first detection procedure in place of the free-capacity data stored in the nonvolatile memory.

4. The recording-medium management method according to claim 3, wherein the first detection procedure is background processing of the recording step.

5. The recording-medium management method according to claim 2, wherein the nonvolatile memory stores the free-capacity data at a plurality of positions repeatedly, and the checking step includes:

performing double-write checking so as to determine whether values of the free-capacity data stored at the plurality of positions match with each other, and when it is determined that the values of the free-capacity data stored at the plurality of positions match with each other, checking whether the value of the free-capacity data stored in the nonvolatile memory exceeds the value of the total capacity of the recording medium.

6. The recording-medium management method according to claim 5, further comprising:

performing a second detection procedure to detect the free-capacity data on the recording medium using the file-management system of the recording medium when it is determined that the values of the free-capacity data stored at the plurality of positions do not match with each other, wherein, when it is determined that the values of the free-capacity data stored at the plurality of positions do not match with each other, the recording step includes recording the desired data onto the recording medium with reference to the free-capacity data detected in the second detection procedure in place of the free-capacity data stored in the nonvolatile memory.

7. The recording-medium management method according to claim 6, further comprising:

using the file-management system of the recording medium, detecting a first data amount of a single file that includes the desired data and that is recorded onto the recording medium;

without using the file-management system of the recording medium, a detecting second data amount of the recorded single file based on the free-capacity data on the recording medium;

determining a difference between the first data amount of the recorded single file and the second data amount of the recorded single file;

performing a third detection procedure to detect the free-capacity data on the recording medium using the file-management system of the recording medium when it is determined that a value of the difference is larger than a predetermined value, wherein when the value of the difference is smaller than the predetermined value, the updating step includes updating the free-capacity data stored in the nonvolatile memory to free-capacity data obtained by subtracting the first data amount from the free-capacity data stored in the nonvolatile memory, and when the value of the difference is larger than the predetermined value, the updating step includes updating the free-capacity data stored in the nonvolatile memory to the free-capacity data detected in the third detection procedure.

8. The recording-medium management method according to claim 2, wherein the recording device holds the recording medium so that the recording medium can be replaced with another recording medium.

9. The recording-medium management method according to claim 2, wherein the recording device holds the recording medium so that it is difficult to replace the recording medium with another recording medium.

10. A program for causing a calculation-processing means to execute a recording-medium-management method used for a recording device which records desired data onto a recording medium, the recording device including a nonvolatile memory which stores and holds data on a free capacity of the recording medium, the recording-medium management method comprising:

checking whether a value of the free-capacity data stored in the nonvolatile memory does not exceed a value of the total capacity of the recording medium when power is turned on;

recording the desired data onto the recording medium with reference to the free-capacity data stored in the nonvolatile memory when it is determined that the value of the free-capacity data stored in the nonvolatile memory does not exceed the value of the total capacity of the recording medium; and updating the free-capacity data stored in the nonvolatile memory when the power is turned off so as to reduce the value of the free-capacity data stored in the nonvolatile memory by as much as an amount of the desired data recorded onto the recording medium.

11. A recording medium recorded with a program for causing a calculation-processing means to execute a recording-medium-management method used for a recording device which records desired data onto a recording medium, the recording device including a nonvolatile memory which stores and holds data on a free capacity of the recording medium, the recording-medium management method comprising:

checking whether a value of the free-capacity data stored in the nonvolatile memory does not exceed a value of the total capacity of the recording medium when power is turned on;

recording the desired data onto the recording medium with reference to the free-capacity data stored in the nonvolatile memory when it is determined that the value of the free-capacity data stored in the nonvolatile memory does not exceed the value of the total capacity of the recording medium; and updating the free-capacity data stored in the nonvolatile memory when the power is turned off so as to reduce the value of the free-capacity data stored in the nonvolatile memory by as much as an amount of the desired data recorded onto the recording medium.

12. A program for causing a calculation-processing unit to execute a recording-medium-management method used for a recording device which records desired data onto a recording medium, the recording device including a nonvolatile memory which stores and holds data on a free capacity of the recording medium, the recording-medium management method comprising:

checking whether a value of the free-capacity data stored in the nonvolatile memory does not exceed a value of the total capacity of the recording medium when power is turned on;

recording the desired data onto the recording medium with reference to the free-capacity data stored in the nonvolatile memory when it is determined that the value of the free-capacity data stored in the nonvolatile memory does not exceed the value of the total capacity of the recording medium; and updating the free-capacity data stored in the nonvolatile memory when the power is turned off so as to reduce the value of the free-capacity data stored in the nonvolatile memory by as much as an amount of the desired data recorded onto the recording medium.

13. A recording medium recorded with a program for causing a calculation-processing unit to execute a recording-medium-management method used for a recording device which records desired data onto a recording medium, the recording device including a nonvolatile memory which stores and holds data on a free capacity of the recording medium, the recording-medium management method comprising:

checking whether a value of the free-capacity data stored in the nonvolatile memory does not exceed a value of the total capacity of the recording medium when power is turned on;

recording the desired data onto the recording medium with reference to the free-capacity data stored in the nonvolatile memory when it is determined that the value of the free-capacity data stored in the nonvolatile memory does not exceed the value of the total capacity of the recording medium; and updating the free-capacity data stored in the nonvolatile memory when the power is turned off so as to reduce the value of the free-capacity data stored in the nonvolatile memory by as much as an amount of the desired data recorded onto the recording medium.

* * * * *